United States Patent [19]
Isaka

[11] Patent Number: 4,570,769
[45] Date of Patent: Feb. 18, 1986

[54] RATCHET MECHANISM

[75] Inventor: Akihiko Isaka, Nagano, Japan

[73] Assignee: Kabushiki Kaisha Sankyo Seiki Seisakusho, Nagano, Japan

[21] Appl. No.: 438,188

[22] Filed: Nov. 1, 1982

[30] Foreign Application Priority Data

Nov. 26, 1981 [JP] Japan ................................ 56-189832
Jan. 14, 1982 [JP] Japan ............................... 57-3504[U]
Jun. 21, 1982 [JP] Japan ............................. 57-92869[U]

[51] Int. Cl.$^4$ ...................... F16D 11/00; F16D 41/12
[52] U.S. Cl. ......................................... 192/46; 192/71;
192/107 T; 192/108
[58] Field of Search ................ 192/46, 71, 107 T, 108,
192/39; 188/82.7, 82.77

[56] References Cited

U.S. PATENT DOCUMENTS

| | | | |
|---|---|---|---|
| 1,566,378 | 12/1925 | Defordt | 192/46 |
| 3,910,557 | 10/1975 | Merriman | 254/150 R |
| 4,125,074 | 11/1978 | Sato | 188/82.7 X |
| 4,130,271 | 12/1978 | Merriman | 192/46 X |
| 4,401,006 | 8/1983 | Sekiguchi | 192/46 X |

FOREIGN PATENT DOCUMENTS

| | | | |
|---|---|---|---|
| 2246447 | 9/1973 | Fed. Rep. of Germany | 192/46 |
| 2723954 | 11/1978 | Fed. Rep. of Germany | 192/46 |
| 657009 | 5/1929 | France | 192/46 |
| 1386955 | 12/1964 | France | 192/46 |
| 55-34342 | 8/1980 | Japan . | |
| 119231 | 9/1980 | Japan | 192/46 |
| 56-17871 | 4/1981 | Japan . | |
| 1169028 | 10/1969 | United Kingdom | 192/46 |

Primary Examiner—Rodney H. Bonck
Attorney, Agent, or Firm—Sughrue, Mion, Zinn, Macpeak and Seas

[57] ABSTRACT

A ratchet mechanism comprises a rotatable member made of synthetic resin and a rotating body mounted coaxially with the rotatable member and having a portion engaging the rotatable member. The rotating body has a plurality of teeth. The rotatable member having an annular peripheral wall and a plurality of U-shaped engagement arms. Each of the arms includes a proximal end portion integral with the annular peripheral wall, a first arm member extending along the annular peripheral wall, and a second arm member having on a free end thereof an engaging portion disposed in a path of angular movement of the teeth of the rotating body and the other end joined to the first arm member.

3 Claims, 10 Drawing Figures

RATCHET MECHANISM

BACKGROUND OF THE INVENTION

The present invention relates to a ratchet mechanism through which a rotational torque is transmitted in one direction, in which at least one of members contacting against each other is made of synthetic resin.

It is advantageous to use synthetic resin to make ratchet mechanisms used in compact devices such as a timer and a music box to which a relatively small mechanical load is applied, in view of a reduction of the mechanical parts to be used, a facilitation of assembly and a reduction of machining cost. Therefore, there have been various attempts to provided ratchet mechanisms having rotational members and transmission members made of synthetic resin.

For example, the Japanese Utility Model Publication No. 55-34342 discloses a ratchet mechanism attaining the above noted objects, but the proposed ratchet mechanism still has various defects. Namely, if the condition in which an engagement distal end of a ratchet arm is kept to be in contact with a tooth of an associated ratchet gear, the arm is forcibly moved outwardly, so that a creep phenomenon would occured in the arm. As a result, the engagement between the distal end of the arm and the tooth of the gear is insufficient, and the distal end of the arm or the tooth would be damaged.

In addition, in the case that the ratchet arm is formed integrally with an outer gear, it is necessary to impart a predetermined amount of movement or flexibility to the engagement portions. For this reason, to prevent a deformation and a damage of the arm, it is necessary to elongate the arm. This leads to the limitation of the number of the arms. For example, in the case that the spring is repeatedly operated, the returning angle of the windup shaft immediately after completion of winding is preferably small for facilitating the winding operation. However, the operational characteristics would deteriorate with a small number of the arms.

Also, with only one engagement portion, upon rotational transmission of torque, the load is applied to the one engagement portion, so that the driven and/or driving members are eccentrically deformed.

To overcome this defect, the Japanese Utility Model Publication No. 56-17871 discloses a ratchet mechanism having a plurality of arms for engagement. However, in that ratchet mechanism, the engaging tooth is one. For this reason, the load would be applied eccentrically thereto upon torque transmission.

Also, a distance between the transmission member formed on the rotational member made of synthetic resin and the engagement portion engaging with the transmission member must be increased in view of the mechanical strength. In addition, also in view of the mechanical strength, the size of each member must be increased. Therefore, in the ratchet mechanism having parts made of synthetic resin, it is difficult to reduce the rotational member in thickness and in diameter and it is impossible to provide a number of tooth steps.

SUMMARY OF THE INVENTION

It is an object of the present invention to provide a ratchet mechanism overcoming the above noted defects and difficulties.

According to a first aspect of the present invention, there is provided a ratchet mechanism comprising a first rotatable member made of synthetic resin and a second rotatable member mounted coaxially with the first rotatable member and fitted in the first rotatable member, either one of the first and second rotatable members having a plurality of resilient engagement arms made of synthetic resin angularly spaced at equal angular intervals and having engaging portions, the other of the rotatable members having a plurality of teeth angularly spaced at equal angular intervals and engageable with the engaging portions of the engagement arms, the ratio between the number of the engagement arms and the number of the teeth being fractional, and the numbers having a common divisor.

With the arrangement of such a ratchet mechanism, the rotatable members are held in engagement with each other through a plurality of angularly equally spaced locations so that they will not be subjected to a load tending to displace them off center during torque transmission.

Furthermore, engagement between the rotatable members through the plurality of locations allows the load resulting from such engagement to be distributed among the locations of engagement, so that the engagement arms can be rendered relatively thin, and hence the component parts can be smaller in diameter and thickness. The load distribution minimizes the difficulty of breakage of the engagement arms. With the engagement arms being thinner and the improved load distritution, the second rotatable member can be angularly moved with respect to the first rotatable member in smaller stepwise angular increments.

According to a second aspect, there is provided a ratchet mechanism comprising a rotatable member made of synthetic resin and a rotating body mounted coaxially on the rotatable member and having a portion engaging the rotatable member, the rotating body having a plurality of teeth, the rotatable member having an annular peripheral wall and a plurality of U-shaped engagement arms each including a proximal end portion integral with the annular peripheral wall, a first arm member extending along the annular peripheral wall, and a second arm member having on a free end thereof an engaging portion disposed in a path of angular movement of the teeth of the rotating body and the other end joined to the first arm member.

With the ratchet mechanism thus constructed, the engagement arms engageable with the teeth of the rotating body are U-shaped to cause the engaging portions thereof to engage the teeth through substantially the same degree of engagement even when the engagement arms are deformed under a stress tending to cause creep. Therefore, the engaging portions will not be broken.

The U-shaped configuration of the arms is useful for distribution of the applied load, so that the arms can withstand an increased imposed load. The U-shaped arms allow their free ends to flex to a large extent irrespective of the relatively small length of the arms. Accordingly, a number of such arms can be installed to thereby reduce an angle of return which a spring windup shaft transverses while a spring is being wound up, with the result that the ratchet mechanism can be operated simply and easily.

According to a third aspect of the present invention, there is provided a ratchet mechanism comprising a rotatable member made of synthetic resin and a rotating body mounted coaxially on the rotatable member and having a portion engaging the rotatable member, the rotatable member having at least four resilient engagement arms extending radially inwardly and angularly spaced at equal angular intervals, the engagement arms having engaging portions at distal ends thereof, the rotating body having teeth extending radially outwardly and angularly spaced at equal angular intervals, the teeth being 1.5 times as many as the engagement arms for selective engagement therewith, the engagement arms being shaped such that when half of the engagement arms are held in engagement with corresponding teeth, the remaining engagement arms are free from undue elastic deformation due to the other teeth and have their engaging portions positioned in a path of angular movement of the teeth.

With the arrangement of such a ratchet mechanism, the teeth are 1.5 times as many as the engagement arms, and those engagement arms which are held out of engagement with the teeth are not greatly deformed by the teeth, so that the engagement arms can engage the teeth reliably during spring windup operation. While the spring is not being wound up, the engagement arms which do not engage the teeth, that is, the engagement arms which do not undergo a torque load imposed by a spring, will not be subjected to elastic deformation and hence will be free from creep even if such a condition of operation continues for an increased period of time. As a consequence, the ratchet mechanism will operate stably for a long period of time. With the teeth being 1.5 times as many as the engagement arms, those teeth and engagement arms which are held out of mutual engagement are angularly staggered from each other by at least half of a pitch of the teeth while the spring is being prevented from being unwound. Thus, such engagement arms do not undergo an unwanted force which would tend to deform the engagement arms.

The four or more engagement arms can engage the teeth at positions which are circumferentially spaced at equal angular intervals, and hence their mutual engagement is balanced to even the force to which the rotatable member made of synthetic resin is subjected. The pitch at which the engagement arms engage the teeth is half the pitch of the teeth, an arrangement that results in a reduced pitch of windup of the spring. Although the U-shaped engagement arms have an increased length, they can cut back the pitch of spring windup and decrease the substantial resiliency of the engagement arms, so that the spring can be wound up with a relatively small force.

DESCRIPTION OF THE PREFERRED EMBODIMENTS

The present invention will now be described in detail with reference to illustrated embodiments, in which the invention is applied to a spring windup mechanism for a music box.

Figure 1:
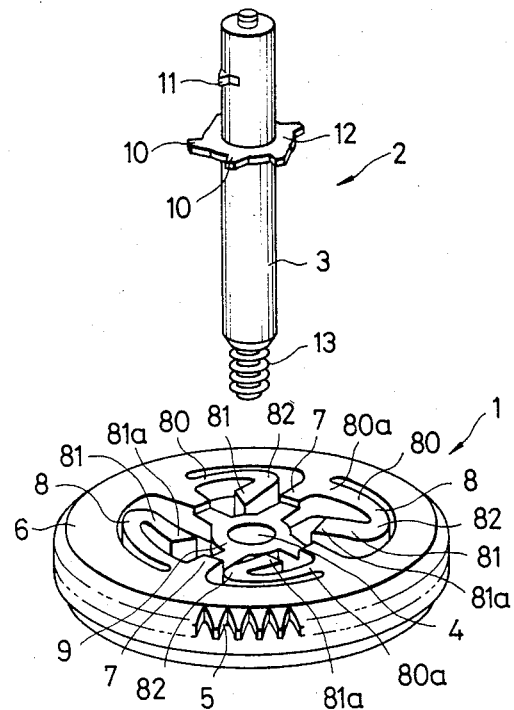
FIG. 1 is a perspective view showing a ratchet mechanism according to the present invention.
Figure 2:
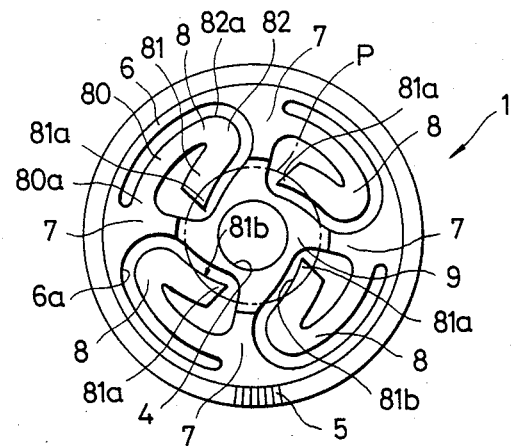
FIG. 2 is a plan view showing ratchet engagement arms shown in FIG. 1.
Figure 3:
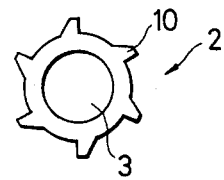
FIG. 3 is a plan view showing a windup shaft shown in FIG. 1.

FIGS. 1 through 3 show a first gear 1 of synthetic resin which serves as a rotatable member and a spring windup shaft 2 which serves as a rotating body. The first gear 1 comprises an axial hole portion 9 having a central hole 4 through which extends a shank 3 of the spring windup shaft 2, an annular peripheral wall or rim 6 having teeth 5 held in mesh with a drum-shaped second gear (not shown) a plurality of spokes 7 interconnecting the annular peripheral wall 6 and the axial hole portion 9, and a plurality of engagement arms 8 extending from the spokes 7, respectively. These parts of the first gear 1 are integrally molded of synthetic resin. In the illustrated embodiment, the spokes 7 are four in number and angularly spaced at equal intervals. Part of the spokes and the axial hole portion 9 provide a recessed surface lower than an end face of the gear 1.

Each of the engagement arms 8 is substantially U-shaped and composed of a first arm portion 80 and a second arm portion 81. The first arm portion 80 has a proximal end 80a integral with a corresponding one of the spokes 7 and extends circumferentially along the annular peripheral wall 6, the first arm portion 80 being joined to the second arm portion 81 by a curved portion 82. The engagement arm 8 is resiliently biased in a direction to position a free engaging distal end 81a of the second arm portion 81 in a path P of angular movement of teeth 10 (described later) on the spring windup shaft 2. The second arm portion 81 has an inner side face 81b inclined at an acute angle with respect to the path P of angular movement of the teeth 10.

The spring windup shaft 2 comprises the shank 3, a retainer 11 to which an end of a spring (not shown) is fastened, a ratchet 12 having the teeth 10, and a threaded end 13 on which a windup key (not shown) can be threaded. The teeth 10 are six in number and extend radially at angularly equally spaced locations in the illustrated embodiment.

Figure 4:
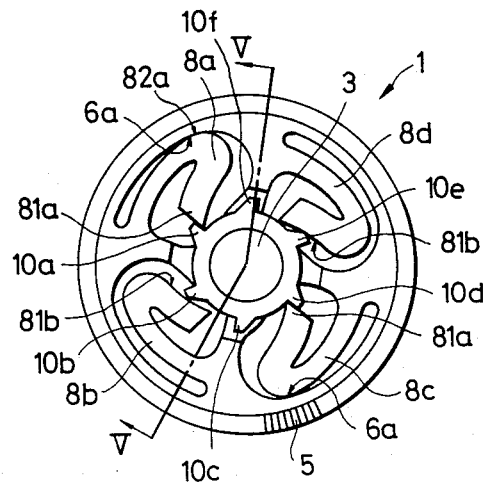
FIG. 4 is a plan view showing the ratchet mechanism in an operating condition.
Figure 5:
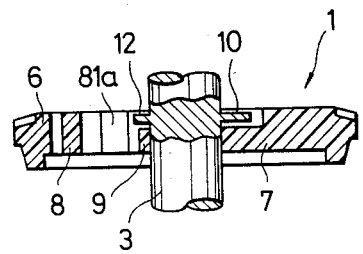
FIG. 5 is a cross sectional view of a part of the ratchet mechanism taken along the line V—V of FIG. 4.

As shown in FIGS. 4 and 5, the shank 3 of the spring windup shaft 2 is fitted in the central hole 4 in the gear 1 with the ratchet 12 placed in the recess in the axial hole portion 9 (see FIG. 5).

In FIG. 4, two teeth 10a, 10d out of the six teeth 10 which are disposed symmetrically in diametrically opposite relation with respect to an axis of rotation of the spring windup shaft 2 are held in engagement respectively with the engaging ends 81a of two symmetric engagement arms 8a, 8c out of the four engagement arms 8. Two symmetric teeth 10b, 10e are held in abutment against the inner side faces 81b of the second arm members 81 of symmetric engagement arms 8b, 8d, respectively. The remaining teeth 10c, 10f are left out of engagement with any of the engagement arms 8. FIG. 4 is illustrative of the position of the parts in which the spring windup shaft 2 is urged to rotate clockwise, as described later on.

Operation of the ratchet mechanism thus constructed will be described in a mode of spring windup and a mode of gear driving.

Figure 6:
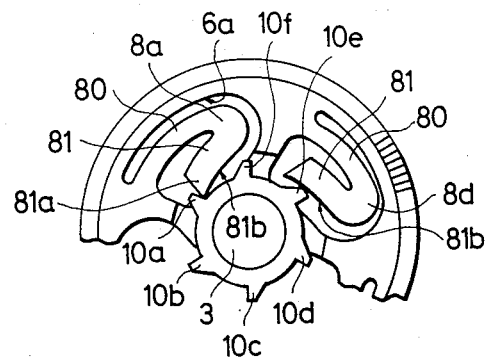
FIG. 6 is a partial plan view showing the ratchet mechanism in another operating condition.

I. Spring windup mode:

When the spring windup shaft 2 is rotated about its own axis counterclockwise in FIG. 4 to windup the non-illustrated spring, the tooth 10e which abuts against the inner side face 81b of the second arm portion 81 of the engagement arm 8d forces the latter to flex radially outwardly as illutrated in FIG. 6. Since the inner side face 81b extends at an acute angle across the path P (FIG. 2) of angular movement of the teeth 10, the tooth 10e smoothly slides on the inner side face 81b under a low torque. Stated otherwise, the engagement arm 8d can be pushed out of the path of angular movement of the tooth 10e under a small force. If the movement of the engagement arm 8d is reduced by increasing the length of the inclined portion of the inner side face 81b and rendering the inclined portion more gradual in slope, the spring windup shaft 2 as a whole can be rotated smoothly for a windup operation.

Continued angular movement of the spring windup shaft 2 causes the tooth 10e to disengage from the engagement arm 8d, the tooth 10d is brought into abutting engagement with the inner side face 81b of the second arm portion 81 which is then pushed radially outwardly.

The engagement arms 8 as they are pushed radially outwardly by the angularly moving teeth 10 are retracted out of the path of angular movement of the teeth 10 with the first arm portions 80 of the U-shaped arms flexing radially outwardly. The first arm portions 80 are thinner and hence are more flexible than the second arm portions 81. Although the above description has been directed to the movement of the some of the teeth 10 and the engagement arms 8, mutually symmetrically located teeth and engagement arms will move in the same manner as described above.

II. Gear driving mode:

In this mode, the torque of the spring as wound up is transmitted to the first gear 1.

When the windup operation of the spring windup shaft 2 is brought to an end, the spring windup shaft 2 is subjected to rotating force from the spring which tends to rotate the spring windup shaft 2 clockwise. Assuming that the tooth 10a is ready for engagement with the engaging end 81a of the engagement arm 8 upon completion of the windup operation, as shown in FIG. 6, the tooth 10a is angularly moved clockwise under the force of the spring into engagement with the engaging end 81a and then turns through a small angular interval before being completely stopped.

More specifically, the engagement arm 8a fails to stop the tooth 10a when the latter engages the engaging end 81a of the first arm portion 81 under the rotative power from the spring as wound. Rather, the second arm member 80 of the engagement arm 8a flexes until an outer side face 82a of the curved portion 82 abuts against an inner peripheral surface 6a of the annular peripheral wall 6, as shown in FIG. 4, whereupon the second arm portion 80 no longer flexes, and the tooth 10a and hence the spring windup shaft 2 are functionally in unison with the first gear 1. The spring windup shaft 2 and the first gear 1 are now together in the clockwise direction in FIG. 4 when a gear train in mesh with the first gear 1 is released of the braking action.

The number of the engagement arms 8 and that of the teeth 10 are selected such that they have a common divisor and their ratio is fractional (4:6 in the illustrated embodiment). Accordingly, the engagement arms 8 and the teeth 10 are held in engagement with each other at angularly equally spaced locations, and any forces acting therebetween can be distributed or divided. Therefore, the engagement arms 8 can be rendered relatively thin and the teeth 10 can engage the engagement arms 8 through desired steps.

Figure 7:
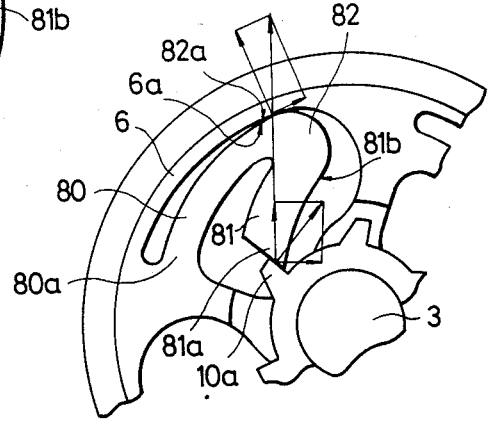
FIG. 7 is an illustration of the force applied to the engagement arm.

When the torque from the spring is retained by the engagement arms 8, the latter is subjected to a large load through the teeth 10. As shown in FIG. 7, the load imposed by the tooth 10a acts on the second arm portion 81 as a compressive or buckling force, acts on the first arm portion 80 as a tensile force, and acts on the outer side face 82a of the curved portion 82 and the inner peripheral face 6a of the annular peripheral wall 6 as a frictional force therebetween. Therefore, the load applied by the tooth 10a is distributed among and borne by various different portions. Even when made of synthetic resin, the engagement arms 8 can sufficiently withstand an increased load caused by the choice of a particular shape. It should be noted that the arrows shown in FIG. 7 are indicative only of the directions of application of forces, and do not represent the magnitudes of such forces.

Where the first gear 1 is integrally molded of synthetic resin, the engagement arms 8 tends to be subjected to creep as they undergo the spring torque at all times while the teeth 10 are forcibly engage the engagement arms 8. The creep causes the permanent deformation of an article of synthetic resin due to prolonged application of a stress thereto.

With the tooth 10a engageable with the free engaging end 81a of the U-shaped engagement arm 8 according to the present invention, the tooth 10a is held against the engaging end 81a with a substantially constant depth or degree of engagement irrespective of whether the engagement arm 8 flexes as shown in FIG. 4 or remains unflexed as shown in FIG. 6.

Those engagement arms which are not directly involved in torque transmission are also designed so that they will not be subjected to creep. More specifically, in FIG. 4, the teeth 10b, 10e are held in abutment respectively against the inner side faces 81b of the second arm members 81 of the engagement arms 8b, 8d. The inner side faces 81b and the teeth 10 are shaped and relatively positioned such that the engagement arms will not undergo a deformation large enough to cause creep. Although in the illustrated embodiment the teeth 10b, 10e are shown as contacting the inner side faces 81b, respectively, they may be out of mutual contact as long as they are not transmitting torque.

Windup operation of the spring can be repeated more easily and smoothly if the spring windup shaft returns through as small an angle as possible immediately after the spring has been wound up in a single windup stroke. Stated otherwise, the more the teeth on the spring windup shaft and the engagement arms on the first gear, the more easily and smoothly the windup operation becomes. Since the teeth and the engagement arms repeatedly change and disengage each other while the spring is being wound up, it is necessary to limit the ratio of the length of the engagement arms to the degree by which the latter flex, that is, the flexure ratio or distortion ratio, to a certain range. Such a requirement is important particularly where the engagement arms and hence the first gear are made of synthetic resin that is susceptible to creep. As the flexure ratio is increased, the engagement arms become easily broken or undergo creep. When the engagement arms are made longer to allow for a larger flexure ratio, they need to be provided in a smaller number. If only one engagement arm is provided, for example, then the first gear and the spring windup shaft become out of coaxial alignment with each other due to creep.

With the arrangement of the present invention, the engagement arms are U-shaped to reduce their flexure ratio, and a number of such engagement arms (four in the illustrated embodiment) can be positioned at circumferentially spaced locations. Each of the engagement arms can flex about two positions, that is, the proximal end 80a of the first arm member 80 and the curved portion 81. Consequently, the overall flexure of the engagement arm is composed of a flexure with respect to the length of the first arm member and a flexure with respect to the length of the second arm member, and the engagement arm is subjected to a small degree of flexure with respect to the circumferential length thereof which corresponds to the length of the first arm member. The U-shaped engagement arms thus are effective for preventing creep and also provide a space large enough to place a plurality of such engagement arms.

The spring windup shaft can angularly move with respect to the first gear through stepped angular intervals which vary with the number of engagement arms and teeth. Such a stepwise angular interval is 30° in the illustrated embodiment.

The ratchet mechanism according to the foregoing embodiment still fails to prevent creep completely, resulting in a tendency to cause difficulties.

Figure 8:
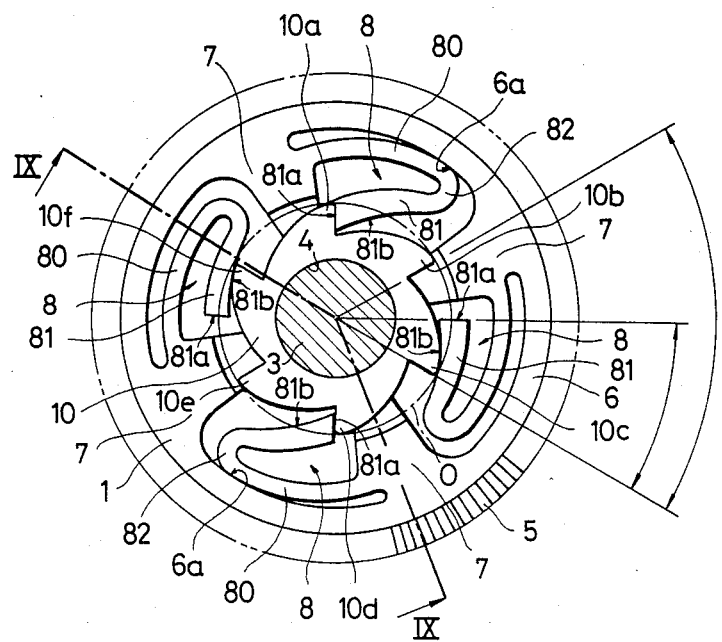
FIG. 8 is a plan view showing another embodiment of the present invention.
Figure 9:
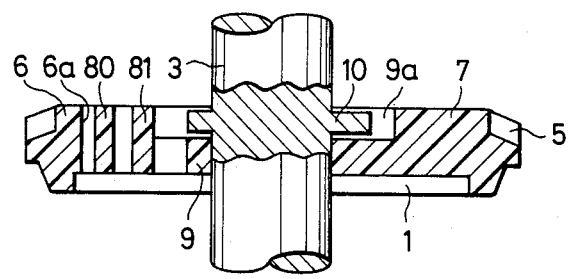
FIG. 9 is a cross sectional view of a part of the ratchet mechanism taken along the line IX—IX of FIG. 8.
Figure 10:
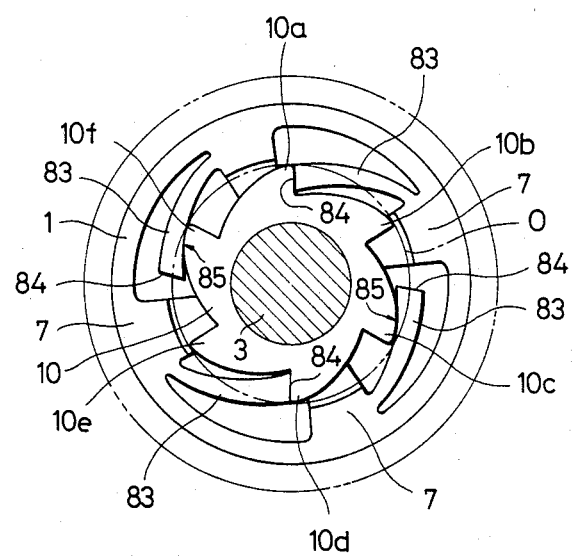
FIG. 10 is a plan view showing still another embodiment of the present invention.

Such a disadvantage can be eliminated by a ratchet mechanism according to another embodiment illustrated in FIGS. 8 through 10, in which the number of teeth are 1.5 times as many as the number of engagement arms so that when half of the engagement arms engage the teeth, the remaining half of the engagement arms which do not engage the teeth are substantially aligned with the path of angular movement of the teeth and hence will not undergo elastic deformation.

The ratchet mechanisms according to the embodiment of FIGS. 8 through 10 will now be described. FIGS. 8 and 9 illustrate a gear or a rotatable member 1 made of synthetic resin and a spring windup shaft 3 having a ratchet or rotating body 10. To the spring windup shaft 3, there is secured an end of a spring (not shown) which can be wound up by rotating the spring windup shaft 3 counterclockwise (FIG. 8) about its own axis.

The rotatable member 1 has on its outer peripheral edge a series of teeth 5 held in mesh with teeth (not illustrated) which may be integrally formed on a drum (not shown) of a music box. The rotatable member 1 includes a central axial hole portion 9 having a central hole 4 through which the spring windup shaft 3 rotatably extends. The axial hole portion 9 is connected to an outer peripheral portion 6 of the rotatable member 1 by a plurality of radial spokes 7 (four in the illustrated embodiment). As shown in FIG. 9, the axial hole portion 9 and part of the spokes 7 have a recess 9a having a bottom lower than an end face of the outer peripheral portion 6 and receiving the rotating body 10 therein.

A plurality (four in the illustrated embodiment) of engagement arms are disposed respectively in spaces defined by the outer peripheral portion 6, the axial hole portion 9, and the adjacent spokes 7. Since the engagement arms 8 are identical in shape but differ only in position, only one of the engagement arms 8 will be described.

The engagement arms 8 comprises a first arm portion or proximal end portion 80 extending from a substantially central portion of the radial spoke 7 clockwise along the outer peripheral portion 6, a second arm portion or bend-over portion 81 extending from a curved portion 82 counterclockwise along the axial hole portion 9, and an engaging portion 81a on a distal end of the bent-over portion 81. The engagement arm 8 as a whole is made of a resiliently deformable material. However, the bent-over portion 81 becomes progressively wider from the curved portion 82 toward the engaging portion 81a so as to be free from deformation for reliably withstanding the torque of the spring imposed when engaging the teeth or projections 10a through 10f which are described below.

The rotating body 10 may be integrally formed with or force-fitted over the spring windup shaft 3. The rotating body 10 has a plurality (six in the illustrated embodiment) of teeth or projections 10a, 10b, 10c, 10d, 10e, 10f which are 1.5 times as many as the number of engagement arms 8. Each of the teeth extends progressively radially outwardly in a direction opposite to the direction in which the spring windup shaft 3 is rotated to wind up the spring.

The teeth 10a, 10d which are symmetric in diametrically opposite relation across the axis of the spring windup shaft 3 are held in engagement with the engaging ends 81a of the engagement arms 8 which are also symmetric with respect to the axis of the spring windup shaft 3. Under the unwinding torque acting from the spring on the rotating body 10, the engagement arms 8 flex at their proximal end portions 80 and the curved portions 82 with outer peripheral faces of junctions between the curved portions 82 and the proximal end portions 80 being in abutment against an inner peripheral surface 6a of the outer peripheral portion 6. At this time, the bent-over portions are spaced apart from the proximal end portions to provide reliable abutting engagement between the engaging ends and the teeth.

The symmetrically disposed teeth 10c, 10f are held in contact or close proximity with inner side faces 81b of the bent-over portions 81 of the symmetrically disposed engagement arms 8 which are substantially in their free state. If the engagement arms 8 are held against the teeth 10c, 10f, the engagement arm 8 suffer from a slight amount of elastic deformation such that their engaging ends 81a are positioned in a path O of angular movement of the teeth. More specifically, the inner side faces 81b of the bent-over portions 81 which lead to their distal engaging ends are shaped such that they are inclined toward the center of rotation of the rotatable body as they extends toward the engaging ends for substantial contact with outer side faces of the teeth 10c, 10f. Therefore, the engagement arms as thus positioned will not be subjected to elastic deformation.

The remaining teeth 10b, 10e which are mutually symmetrically positioned are completely out of engagement with any engagement arm. The engaging end 81a of one of the engagement arms 8 which remains out of engagement is located halfway in a pitch between the crests of the teeth 10b, 10c because of the selected numbers of the engagement arms and the teeth. Likewise, the engaging end 81a of the other engagement arm 8 is positioned midway between the crests of the teeth 10e, 10f.

FIG. 8 shows the position of the parts in which the torque from the non-illustrated spring is transmitted to the rotatable body 1 through engagement between the teeth 10a, 10d and the associated engagement arms 8. Study of FIG. 8 indicates that rotative power from the rotating body 10 is transmitted to the rotatable member 1 through the symmetric positions across the axis of rotation, and no force is imposed which would tend to significantly deform the engagement arms 8 which are held out of engagement.

Where such a ratchet mechanism is incorporated in a music box, there are many instances in which the torque of the spring keeps on being exerted to the rotatable member 1. With the arrangement of the present invention, the spring torque is transmitted through the symmetric positions, and hence there is no possibility for the rotating body and the rotatable member to be displaced off center with respect to each other. Since the engaging ends 81a of the free engagement arms 8 are disposed in the path of angular movement of the teeth, these engaging ends 81a are in a position for reliable engagement with the teeth over a long period of time.

Operation for winding up the non-illustrated spring will be described.

Assuming that the rotatable member 1 is prevented from rotation by a gear train meshing with the teeth 5 in FIG. 8, when the spring windup shaft 3 is rotated counterclockwise, the teeth 10a, 10d disengage from the engaging ends 81a. Simultaneously, the teeth 10c, 10f push the inner side faces 81b of the bent-over portions 81 of the engagement arms 8 to displace the latter radially outwardly of the path O of angular movement of the teeth. When the teeth 10c, 10f has angularly moved half of the pitch of the teeth to disengage from the inner side faces 81b, the engagement arms 8 resiliently return to their original positions in which their engaging ends 81a are disposed in the path O of angular movement of the teeth.

The teeth 10b, 10e that have been free of engagement are brought into abutting engagement with the inner side faces 81b of the bent-over portions 81 of the engagement arms 8 to push the latter out of the path O of angular movement of the teeth. Subsequent disengagement of the teeth 10b, 10e from the inner side faces 81b allows the engagement arms 8 to return resiliently to positions in which they are engageable with the teeth. With the illustrated embodiment, the teeth engage the engagement arms after the teeth have been angularly moved through about 60°. Therefore, the spring can be wound up smoothly as the teeth and the engagement arms engage one another at relatively short intervals or pitches.

The engagement arms are U-shaped and hence are of an increased length. This permits the engagement arms to be subjected to less elastic deformation upon being displaced out of the path of angular movement of the teeth while the spring is being wound up. Stated otherwise, the spring can be wound up with a small force.

FIG. 10 is illustrative of a ratchet mechanism according to still another embodiment of the present invention. The ratchet mechanism shown in FIG. 10 is substantially the same in operation and advantages as the ratchet mechanism according to the embodiment shown in FIGS. 8 and 9, but differs therefrom only as to the shape of engagement arms. Identical or corresponding parts shown in FIG. 10 are denoted by identical or corresponding reference characters illustrated in FIGS. 8 and 9, and will not be described in detail.

The ratchet mechanism of FIG. 10 comprises a plurality of engagement arms 83 extending respectively from the radial spokes 7 in the counterclockwise direction and having engaging end portions 84 positioned in a path O of angular movement of the teeth. The symmetrically disposed engagement arms 83 are held in engagement with the symmetrically disposed teeth 10a, 10d. The teeth 10c, 10f are held in contact or close proximity with inner side faces 85 of the other engagement arms 83 which have their engaging end portions 84 located in the path O of angular movement of the teeth and which are not deformed to a large extend. The engagement arms 83 when they are out of engagement with the teeth, are shaped in complementary relation to outer side faces of the teeth. Accordingly, the engagement arms are prevented from being deformed and hence from creep, and the ratchet mechanism can operate reliably.

What is claimed is:

1. A ratchet mechanism comprising a first rotatable member made of synthetic resin and a second rotatable mounted coaxially with said first rotatable member, either one of said first and second rotatable members having a plurality of U-shaped resilient engagement arms made of synthetic resin angularly spaced at equal angular intervals and having engaging portions, the other of said rotatable members having a plurality of teeth angularly spaced at equal angular intervals and engageable with said engaging portions of said engagement arms when said first and second rotatable members rotate together in a first direction, said teeth deflecting said engagement arms when said first and second rotatable members rotate relative to each other opposite said first direction, a bent portion of said U-shaped arms contacting a periphery of said one of said rotatable members opposed to said teeth when said first and second rotatable members rotate together in said first direction and said teeth engage said engaging portions of said contacting arms.

2. A ratchet mechansim comprising a rotatable member made of synthetic resin and a rotating body mounted coaxially with the rotatable member and having a portion engaging said rotatable member, the rotating body having a plurality of teeth, said rotatable member having an annular peripheral wall and a plurality of U-shaped engagement arms each including a proximal end portion integral with the annular peripheral wall, a first arm member extending along the annular peripheral wall, and a second arm member having on a free end thereof an engaging portion disposed in a path of angular movement of said teeth of said rotating body and the other end joined to the first arm member, said teeth being engageable with said engaging portions when said rotatable member and said rotating body rotate together in a first direction and deflecting said engagement arms when said rotatable member and said rotating body rotate relative to each other opposite said first direction.

3. A ratchet mechanism according to claim 2, wherein said first arm is thinner than said second arm.

* * * * *